United States Patent
Dakss et al.

[11] 3,864,016
[45] Feb. 4, 1975

[54] HOLOGRAPHIC FIBER TO WAVEGUIDE COUPLER

[75] Inventors: Mark L. Dakss, Yonkers; Stanley A. Zemon, New York, both of N.Y.

[73] Assignee: GTE Laboratories Incorporated, Waltham, Mass.

[22] Filed: Apr. 10, 1972

[21] Appl. No.: 242,491

[52] U.S. Cl. ............ 350/96 WG, 350/3.5, 350/96 C
[51] Int. Cl. ............................................ G02b 5/14
[58] Field of Search ............. 350/96 WG, 96 C, 3.5

[56] References Cited
UNITED STATES PATENTS
3,674,336   7/1972   Kogelnik .................. 350/96 WG
3,707,371  12/1972   Files ........................ 350/96 WG OTHER PUBLICATIONS
Ask et al., "Interconnection of Optical Fibers..." 2/71, pg. 2529-2530, IBM Tech. Disc. Bull., Vol. 13, No. 9.
Tamir, "Lateral Displacement.... Periodic Structure," 10/71, pg. 1397-1413, J.O.S.A., Vol. 61, No. 10.
Tren, "Right Waves In Thin Films and Integrated Optics," 11/71, pg. 2395-2413, Applied Optics, Vol. 10, No. 11.
Pennington et al., "Halographic Technique for...," 10/71, pg. 1493-1494, IBM Tech. Disc. Bull., Vol. 14, No. 5.

*Primary Examiner*—Maynard R. Wilbur
*Assistant Examiner*—N. Moskowitz
*Attorney, Agent, or Firm*—Irving M. Kriegsman; Bernard L. Sweeney

[57] ABSTRACT

A device and method for coupling the output light field from an optical fiber to a thin-film optical waveguide are described. A hologram is formed in the path of the fiber output beam and is in communication with the optical waveguide. The hologram converts the fiber output field to an optical guided wave with practical efficiencies. In one embodiment, the hologram is formed in a photoresist layer by exposing the layer to the interference pattern formed between the fiber output light beam and an optical guided wave introduced in the waveguide with the aid of a grating coupler.

13 Claims, 6 Drawing Figures

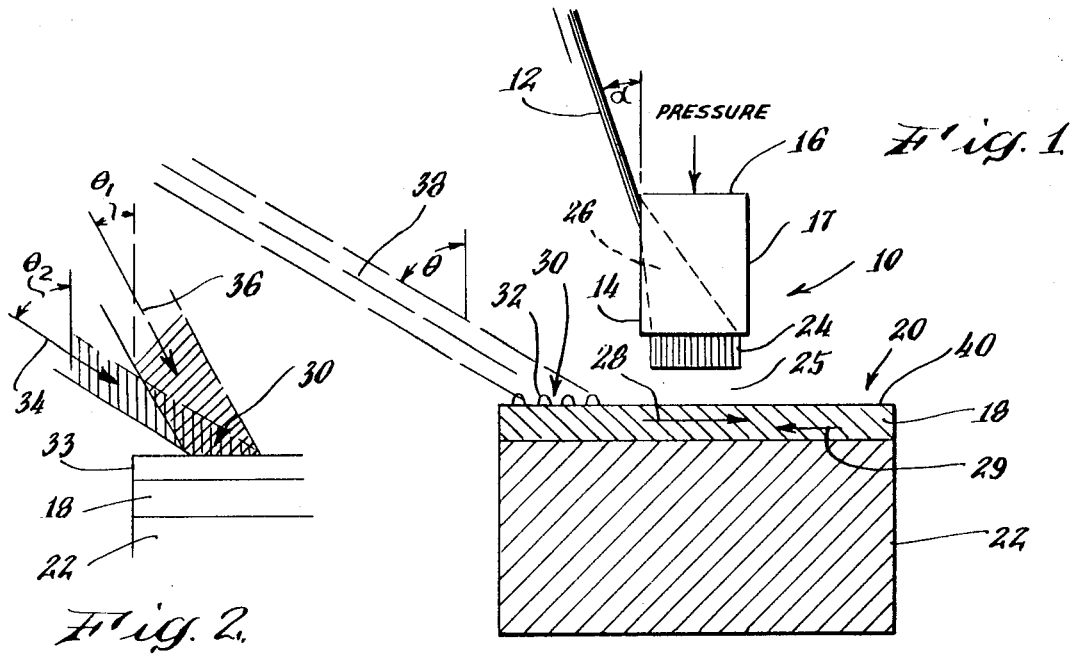
Fig. 1.
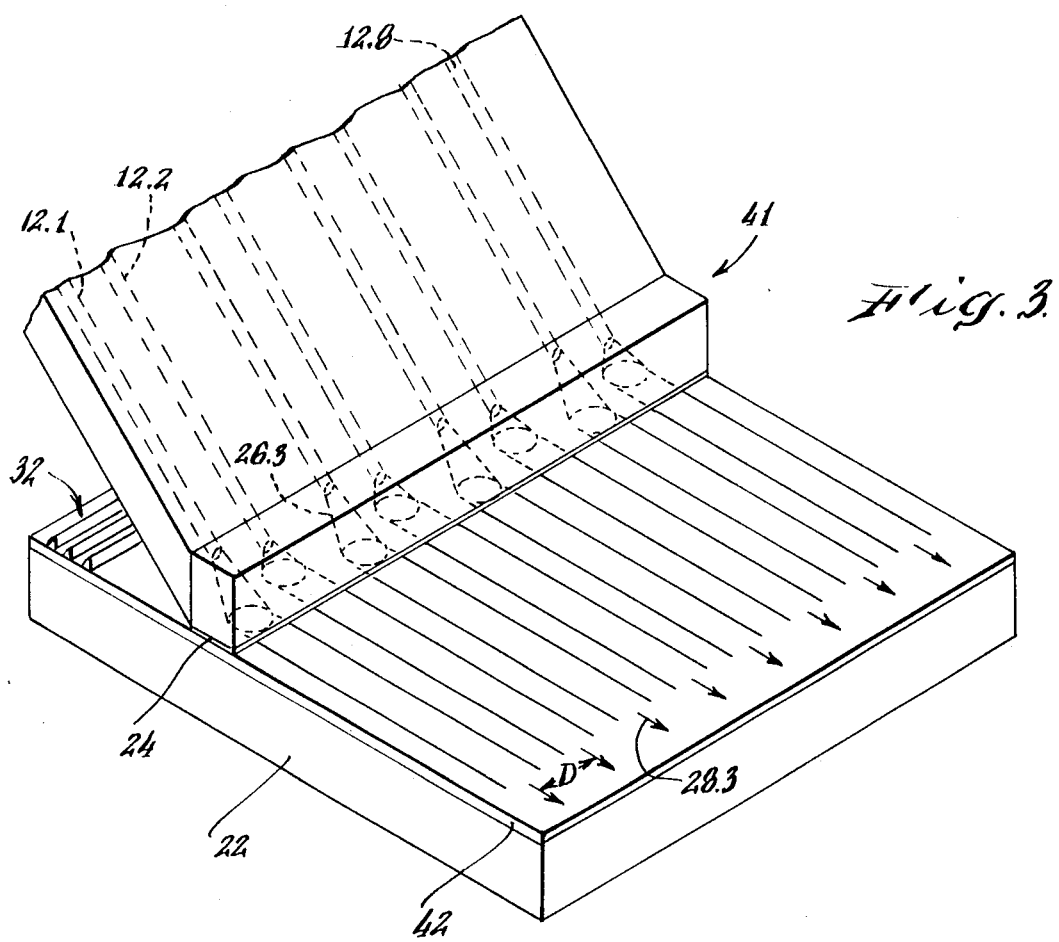
Fig. 2.
Fig. 3.

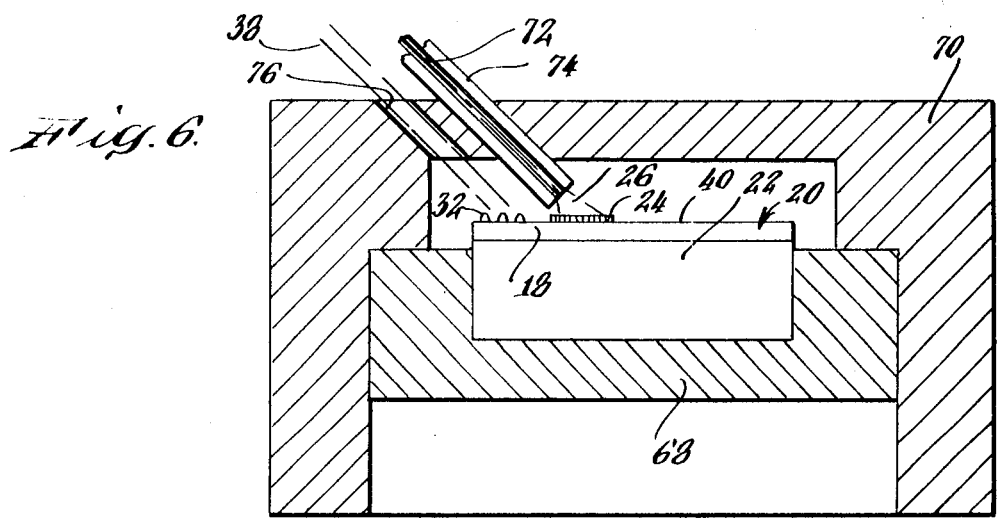
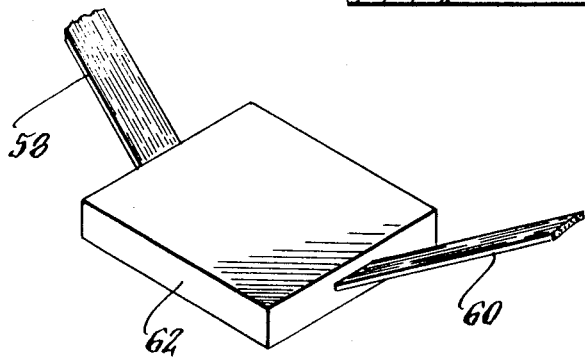
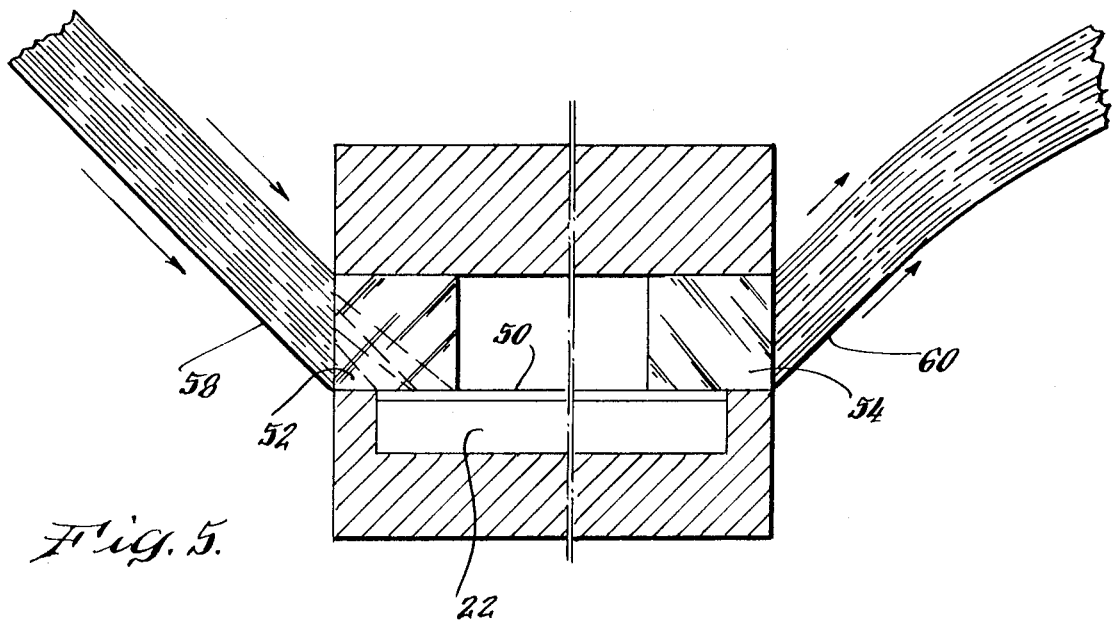

HOLOGRAPHIC FIBER TO WAVEGUIDE COUPLER

SUMMARY OF THE INVENTION

This invention generally relates to light communication systems and, more specifically, to a device for coupling a light conductive fiber to thin-film optical waveguides for use with integrated optical circuits.

BACKGROUND OF THE INVENTION

Recent developments in communications involve light transmission systems because of their large band width. A promising optical transmission medium is the glass optical fiber. For example, a single-mode optical fiber has been reported with an attenuation of 20db/km and with dispersion characteristics which permit $10^{10}$ bits/sec transmission over distances measured in kilometers (as reported by R. D. Maurer, in "Progress in Optical Fibers" an invited paper at the Conference on Laser and Engineering Applications, Washington, D. C. June 1–3, 1971 and referred to at page 36 in the *Digest of Technical Papers* in the June 1971 issue of the IEEE Journal of Quantum Electronics).

The laser plays a vital role in optical transmission systems and the desire for practical means for processing (e.g., modulating, detecting) laser beams has given birth to a new field generally known as Integrated Optics (see, for example, articles by Stewart E. Miller, "A Survey of Integrated Optics" published in the IEEE Journal of Quantum Electronics, February 1972 Vol. QE-8 No. 2 at page 199 and "Integrated Optics: An Introduction" Bell Technical Journal Vol. 48, September 1969, No. 7, page 2059).

An integrated optical circuit (IOC) utilizes miniature optical waveguide circuitry for such purposes as modulation, detection and amplification and the like. The integrated optical circuit has distinct advantages over free or unguided laser beam technology where larger optical elements such as lenses are employed. The IOC technology, if realized, would permit mass-production techniques similar to those used in integrated circuits. Such mass-production techniques will be used to make inexpensive, rugged, prealigned integrated optical circuits which would be insensitive to environmental effects such as vibrations.

In an integrated optical circuit, an optical sub-system for signal processing is in the form of a thin-film optical waveguide network which can be completely located on a single circular wafer of about one inch diameter.

A critical problem in the implementation of practical optical communications systems based on a glass fiber for transmission and an integrated optical circuit (IOC) for information processing is the optical coupling between a fiber and the IOC.

One coupling method utilizes the coupling between a thin-film optical waveguide and a parallel mounted fiber. (See Ash, Dakss, Heidrich and Powell, IBM Technical Disclosure Bulletin, February 1971, Vol. 13, No. 9, page 2529.). This coupling method has major disadvantages caused by critical parallelism and spacings between the fiber and waveguide, the preparatory work on the fiber such as polishing and partial removal of the fiber cladding and the requirements on interfiber or inter-waveguide spacing when coupling a multiple of information transmitting fibers.

Another coupling method employs a lens for collimating the light diverging from an end of the fiber, followed by a plane-wave-to-thin-film coupler such as a grating coupler described in an article by Dakss, Kuhn, Heidrich and Scott entitled "Grating Coupler For Efficient Excitation of Optical Guided Waves In Thin-Films" published in Applied Physics Letters, Vol. 16 No. 12 on page 523.

As described in the latter article, a laser beam is coupled to a thin-film optical waveguide bearing an optical phase grating made from photoresist material and fabricated directly on the film. A laser beam incident on the grating at a particular angle will launch a guided wave in the thin-film waveguide with an efficiency of the order of 40 percent.

When a lens is used to couple the light from a fiber on to a grating coupler, expensive optics must be employed and precisely aligned to the fiber, working against the advantages of the integrated optical circuitry. Such lens relying scheme is not easily or cheaply adaptable to the case of coupling a multifiber array to an IOC.

SUMMARY OF THE INVENTION

In a fiber to integrated optical circuit coupler in accordance with the invention, the light from a fiber is directly coupled to a thin-film waveguide by a hologram. The hologram provides a transformation of the fiber beam into a guided wave in the thin-film waveguide and also transforms in a reverse direction from the waveguide to the fiber. The hologram may be formed in a photo-sensitive material by interfering the evanescent portion of the coherent wave within the waveguide with a coherent beam emanating from the end of a fiber.

An optical coupler and the method for making it in accordance with the invention are advantageously employed to couple many fibers to integrated optical circuits. The holographic coupling technique of this invention advantageously reduces expensive material processing as required by prior art couplers and is consistent with the advantages of integrated optical circuits. A coupler of this invention is capable of high coupling efficiencies and advantageously more tolerable of fiber misalignments.

It is, therefore, an object of the invention to provide a device and method for coupling the optical beam from the end of a fiber or a plurality of fibers to one or several optical waveguides in an efficient and practical manner. Other advantages and objects will be understood from the following description of a preferred embodiment of the invention described in conjunction with the drawings wherein FIG. 1 is a simplified schematic section view of a holographic optical coupler in accordance with the invention;

FIG. 2 is a schematic representation of a portion of the end section of an integrated optical circuit showing a step employed in forming a grating coupler;

FIG. 3 is a perspective enlarged view illustrating the employment of a multiple fiber hologram coupler in accordance with the invention;

FIG. 4 is a perspective enlarged view of an integrated optical circuit with input and output hologram couplers in accordance with the invention; and FIG. 5 is an enlarged section view of a coupler employed with the integrated optical circuit shown in FIG. 4.

FIG. 6 is a section view of an alternate embodiment for a holographic coupler in accordance with the invention.

With reference to FIG. 1, an enlarged coupler 10 in accordance with the invention is shown. A light carrying fiber 12 is mounted to a face 14 of a glass block 16 with a suitable cement of matching refractive index to provide a rugged connection. The block 16 need not be made of glass and can be made of other optically transparent materials. The glass block 16 is shown mounted over a thin-film optical waveguide 18, which is coupled to an integrated optical circuit 20 formed on a substrate 22. The integrated optical circuit may include a variety of active and passive elements which have been deleted from the drawing for clarity.

Between the glass block 16 and thin-film waveguide 18 is a layer 24 of photo-sensitive material and a thin air space 25 maintained by spacers (not shown). The photo-sensitive material, which may be a photoresist, is exposed and developed to form a hologram produced when a beam 26 from fiber 12 interferes with the evanescent field of an optical guided wave (represented by arrow 28) in thin-film waveguide 18. The hologram converts light from fiber 12 into the proper mode to launch an optical guided wave in thin-film waveguide 18 or vice-versa. The angle $\alpha$ with which the fiber 12 is oriented relative to face 14 is selected sufficiently small so as to prevent the beam 26 within glass block 16 from hitting the opposite end wall 17 and yet sufficiently large to form reasonably sized interference fringes below block 16. A typical angle $\alpha$ of 45° has been found practical. Note that in order to couple from the thin-film waveguide to a fiber, the direction of the optical guided wave must be in the direction of arrow 29, or opposite to that of optical guided wave 28 shown in FIG. 1.

Construction of coupler 10 commences with a preformed thin-film optical waveguide 18 covered at a convenient area 30 with a grating coupler 32. The grating coupler is formed, as shown in FIG. 2, by exposing a photoresist layer 33 to the fringe pattern formed by the interference of a pair of laser beams 34 and 36 of desired wavelength and directed at area 30. The photoresist is developed to produce the phase grating 32 as further described in the previously identified Dakss et al. article in *Applied Physics Letters*. When a plane wave laser beam 38 is directed at the grating coupler 32 with the proper angle $\theta$ (See FIG. 1), an optical guided wave 28 may be launched in waveguide 18.

Glass block 16, bearing an assembled fiber 12 and a layer of photoresist 24, is pressed close (within a half wavelength of the light) to the thin-film optical waveguide 18. This assures close coupling with the evanescent segment of the optical coupler 32 and the optical guided wave produced thereby is made to interfere with the beam 26 of like wavelength from fiber 12. A thin layer of photoresist 24 adjacent to thin-film waveguide 18 is then exposed to their interference pattern to form the desired hologram. Glass block 16 may then be removed to develop the photoresist hologram in layer 24 after which the glass block 16 is replaced. Since the hologram remains in the same position relative to fiber 12, the replacement of glass block 16 need not be precisely in the same position as long as the properties of waveguide 18 remain unchanged.

The photosensitive layer 24 may be formed of a variety of materials. For instance, a standard, well-known photoresist from the Shipley Company, AZ-1350, may be employed, though this requires removal of glass block 16 for development and is restricted to light wavelengths of 4,880A (or 5,300A with very long exposures). Other more panchromatic recording materials are possible. Holographic materials which are capable of forming holograms in essentially real-time and in-situ are being developed as described in an article by W. S. Colburn and K. A. Haines, "Volume Hologram Formation in Photopolymer Materials" published in *Applied Optics*, Vol. 10, No. 7, July 1971 at page 1636. Such in-situ developed holographic materials would eliminate the glass block removal step and its replacement and thus simplify the formation of the hologram. In such case, the hologram may be formed directly on the top surface 40 of the thin-film waveguide 18 without the need for removal and replacement of glass block 16.

The thickness of layer 24 need not be submicron (it may be several microns). Only the region within a micron or so from surface 40 of thin-film waveguide 18 will form the hologram since only this region will see the evanescent wave from the optical guided wave 28. The refractive index of the recording layer 24 should be smaller than that of the thin-film waveguide 18 to reduce loading.

Note that the thin-film optical guided wave 28 used to form the hologram in FIG. 1 may be generated by techniques other than with the grating coupler 32. For example, a prism coupler technique may be used as described in the article by Tien et al. entitled "Modes of propagating light waves in thin deposited semiconductor films" and published in Applied Physics Letters, 14, page 291 (1969).

The holographic coupler of this invention may further be employed to couple fibers to planar waveguides such as diffused and ion-implanted waveguides. The planar waveguides may be two-dimensional (single-mode) waveguides.

The air gap 25 between the recording medium 24 and the IOC 20 may be replaced with a low-index thin-film to eliminate the need to apply pressure. The fiber 12 may be formed of the graded-index type such as marketed by the Nippon Glass Company under the name SELFOC.

FIG. 6 shows an alternate holographic coupler where the glass block 16 of FIG. 1 may be dispensed with. A recording medium 24 is shown as a deposited layer (such as spun photoresist) directly on surface 40 of the optical waveguide region 18. The substrate 22 on which the optical waveguide region 18 and IOC 20 are located is mounted in a locating block 68. Block 68 is removably mounted to a structure 70 and is accurately located within 0.1 mil [2.5 microns] relative to a fiber 72. Fiber 72 is held in a rigid mounting 74 and oriented to direct its beam 26 onto photoresist layer 24. A laser beam 38 is directed onto a grating coupler 32 through a bore 76 to form the hologram in layer 24 in the manner as described with reference to FIG. 1.

With the location accuracy for block 68 of 2.5 microns, the latter may be removed to develop the exposed layer 24 and then replaced. The structure of FIG. 6 is particularly practical to couple optical waves emanating from IOC 20 to fiber 72. In such case, an acceptable coupling efficiency between the beam from the holographic coupler and fiber 72 is obtained when a graded-index fiber such as the previously described SELFOC is used.

The embodiment of FIG. 6 is further suitable for a real-time developed recording material such as an amorphous semiconductor. Alternatively, the hologram can be formed directly in the optical waveguide 18 when this itself is made of a photoresist (see the article by Weber et al. entitled "Light-guiding Structures of Photoresist Films" published in Applied Physics Letters 20, page 143 (1972)).

The optical coupler is particularly suitable for coupling a multiple number of fibers 12 to an integrated optical circuit as illustrated with coupler 41 in FIG. 3 wherein the coupling of a double row of fibers is shown. In such case, a grating coupler 32 is used to produce discrete thin-film optical guided waves with center to center spacings D, which may have a value of about 10 mils, to produce a hologram for each fiber 12. The fibers 12 in each row need not be located exactly in a linear row and, in fact, their placement can tolerate some sloppiness because the hologram in layer 24 will accommodate itself to the fiber placements. The two rows are staggered to bring the thin-film waveguides as close together as possible. The recording of the hologram can be performed with a single wide optical guided wave reference beam which fills the entire film 42 to expose the layer 24 below all fiber beams 26 simultaneously.

Although the optical guided waves 28 from couplers such as 10 or 41 have been assumed as collimated and equal in width to the beam emerging from the fibers at the hologram, such collimation is not always required. For example, when the reference beams, from which the hologram is made, is a converging beam, the optical guided wave generated from fiber beams 26 by the holograms also converge. Such focused optical guided waves can perform specific functions such as feeding a two-dimensional (single mode) planar waveguide or for spatial filtering.

FIGS. 4 and 5 illustrate an integrated optical circuit 50 on substrate 22 which has an input holographic coupler 52 and an output holographic coupler 54. Couplers 52 and 54 provide multiple fiber coupling for convenient signal processing in long transmission paths measured in kilometers. A sealed encasement 62 is employed and extended to protect adjacent input and output fiber cables 58 and 60 respectively.

Having thus described a hologram coupler in accordance with the invention, its advantages may be appreciated. The diverging light from an optical fiber may be efficiently converted to an optical guided wave and the reverse coupling from an optical guided wave to a fiber is obtained with similar efficiency. The fixed placement of the hologram relative to the fiber has eliminated critical fiber placement problems such as imposed by coupling methods described in an article by Ash, Dakss, Heidrich and Powell in Vol. 13, No. 9, page 2529 of the IBM Technical Disclosure Bulletin of February 1971. The adaptability of the coupler of this invention to multiple fibers significantly enhances the utility of the coupler while achieving a rugged structure which is compatible with optical miniaturization concepts.

What is claimed is:

1. A device for optically coupling a light-carrying fiber and an optical waveguide in an integrated optical circuit to each other, comprising an optical circuit having an optical waveguide for propagating an optical guided wave, an optical fiber mounted over the waveguide to direct an output beam from an end thereof upon a coupling surface of the optical waveguide, and a hologram positioned in the path of the fiber output beam and in optical communication with the optical waveguide, said hologram having an interference pattern function selected to convert the output light field from the fiber to that of an optical guided wave.

2. The coupling device as claimed in claim 1 wherein said optical waveguide is in the form of a thin-film optical waveguide.

3. A device for optically coupling a light-carrying fiber and an optical waveguide in an integrated optical circuit comprising an optical circuit having an optical waveguide for propagating an optical guided wave, an optical fiber mounted over the optical circuit to direct a beam in the far field upon a surface of the optical waveguide, and a photo-recording material layer interposed between the optical fiber and the surface of the optical waveguide, said material having a coupling segment in close adjacency to the optical waveguide to receive a portion of the optical waves propagating therealong, said photo-recording material further being provided with an interference pattern in the coupling segment thereof, said interference pattern formed by light propagating in said optical waveguide interfering with light beam propagating from said optical fiber, to produce a hologram having a conversion function selected to convert the light in the far field propagating from the fiber to that of said optical guided wave.

4. The device for optically coupling light-carrying fibers to optical waveguides as claimed in claim 3, and further including an optically transparent block having a coupling side shaped for placement adjacent said surface of the optical waveguide, said optical fiber being mounted to the block with an orientation selected to produce a broadened beam upon said surface.

5. The device for optically coupling light-carrying fibers to optical waveguides as claimed in claim 4 wherein said optical waveguide is a thin-film waveguide structure.

6. A device for coupling a plurality of light-carrying fibers to an integrated optical circuit comprising an integrated optical circuit having a thin-film optical path for guiding a plurality of optical waves, a plurality of light-carrying fibers mounted on said circuit, with said fibers oriented to direct their beams of light at said thin-film path in the far field, and a hologram material layer interposed between the beams from the fibers and the thin-film path, said layer being provided with an interference pattern established by light propagating in said thin-film path interfering with light in the far field propagating from said fibers, said interference pattern to produce a hologram which transforms the light beams from the fibers into guided waves in said thin-film path.

7. The coupling device as claimed in claim 6 wherein said thin-film path is formed of a plurality of discrete thin-film optical waveguides, and wherein each fiber is aligned with an optical waveguide.

8. The coupling device as claimed in claim 6 and further including a transparent coupling block having a first face connected to the fibers and a second face bearing a predetermined angle relative to the first face, with the fibers oriented to project an enlarged beam upon the second face, said second face being located in close proximity with the thin-film path, and wherein said hologram material converts the fiber beams incident upon the second face of the transparent block into optical guided waves in the thin-film optical path.

9. A method for forming a device to couple light-carrying fibers to optical waveguides comprising the steps of mounting an optical fiber with its far-field output light beam in light communication relationship with an optical waveguide, placing a photosensitive material layer between the light-carrying fiber to be optically coupled to the waveguide and a coupling surface of the waveguide, said photosensitive material having an interference pattern carrying segment in close proximity with the coupling surface to receive an evanescent portion of light waves propagating along the optical waveguide, launching a first coherent light wave in the waveguide and simultaneously directing a second coherent light wave through the fiber and the photosensitive material layer and its interference pattern carrying segment onto the waveguide to generate a permanent hologram in the photosensitive material upon interference of the output light field from the fiber with the evanescent portion of the light wave in the waveguide, and placing said hologram in the path of the far-field optical fiber beam and in coupling relationship with the optical waveguide, said hologram being effective to convert the optical fiber beam to an optical guided wave in said waveguide.

10. The method for forming a coupling device as claimed in claim 9 wherein said material is formed of a photoresist material, and wherein said directing step is followed by the steps of removing the photoresist material from the coupling surface of the waveguide without disturbing the orientation and position of the fiber relative to the interference exposure, and developing the light interference exposed photoresist material to fix the hologram.

11. The method for forming a coupling device as claimed in claim 9 wherein said photosensitive material is formed of an in-situ light developed material while maintaining contact between the material and the optical waveguide.

12. The method for forming a coupling device as claimed in claim 9 wherein said step for launching a coherent wave includes the steps of forming a grating coupler on the optical waveguide to launch an optical guided wave in the waveguide, and directing a laser beam at the grating coupler to launch an optical guided wave for interference with the output far-field light beam from the fiber in said interference segment of the photosensitive material.

13. The method for forming a coupling device as claimed in claim 9 wherein said photosensitive material layer is directly deposited on the surface of an optical waveguide.

* * * * *